United States Patent [19]

Fukumizu et al.

[11] Patent Number: 4,695,165
[45] Date of Patent: Sep. 22, 1987

[54] CAVITY TRANSFER MIXING EXTRUDER

[75] Inventors: Shinnichi Fukumizu; Kimio Inoue; Akimasa Kuriyama, all of Hyogo, Japan

[73] Assignee: Kabushiki Kaisha Kobe Seiko Sho, Kobe, Japan

[21] Appl. No.: 918,548

[22] Filed: Oct. 14, 1986

[30] Foreign Application Priority Data

Oct. 14, 1985 [JP] Japan ................................ 60-229573
Feb. 24, 1986 [JP] Japan ............................. 61-25998[U]
Mar. 7, 1986 [JP] Japan ............................. 61-33484[U]

[51] Int. Cl.$^4$ ............................................... B29B 7/40
[52] U.S. Cl. ................................. 366/90; 264/211.21; 366/307; 425/208; 425/209
[58] Field of Search ...................... 366/79, 80, 88, 89, 366/90, 99, 279, 307; 264/176.1, 211.21, 211.23, 349; 425/202, 204, 205, 206, 207, 208, 209, 376 R, 376 B

[56] References Cited

U.S. PATENT DOCUMENTS

| | | | |
|---|---|---|---|
| 2,669,750 | 2/1954 | Keeney | 425/207 |
| 4,419,014 | 12/1983 | Gale | 425/202 |
| 4,517,107 | 5/1985 | Clarke et al. | 425/207 |
| 4,595,546 | 6/1986 | Wheeler, Jr. | 425/207 |
| 4,639,143 | 1/1987 | Frankland, Jr. | 366/90 |

FOREIGN PATENT DOCUMENTS

| | | | |
|---|---|---|---|
| 226770 | 5/1959 | Australia | 366/76 |
| 2520807 | 11/1976 | Fed. Rep. of Germany | 425/207 |

Primary Examiner—Jay H. Woo
Assistant Examiner—J. Fortenberry
Attorney, Agent, or Firm—Oblon, Fisher, Spivak, McClelland, & Maier

[57] ABSTRACT

A cavity transfer mixing extruder which includes an extrusion unit and a mixing unit, which are united coaxially. The extrusion unit includes a barrel provided with a feed opening through which materials are fed into the barrel, and a screw shaft coaxially and rotatably extended through the barrel. The mixing unit includes a housing, a stator fixedly fitted in the housing and a first cavity group including circumferential cavity rows of cavities in the inner circumference thereof, and rotor joined coaxially to the front end of the screw shaft, coaxially rotatably extended through the stator, and provided with a second cavity group including circumferential cavity rows of cavities in the outer circumference thereof. The respective cavities of the first and second cavity groups, when developed on a plane, each has a parallelogrammic shape defined by a pair of opposite, parallel straight walls extending perpendicularly to the axial direction, and a pair of opposite, parallel straight walls inclined at an angle to the axial direction. The longitudinal axes of the cavities of the first cavity group, and the longitudinal axes of the cavities of the second cavity group are inclined in opposite directions, respectively, with respect to the axial direction so that the materials filling the cavities are forced forward as the rotor is rotated relative to the stator.

3 Claims, 32 Drawing Figures

CAVITY TRANSFER MIXING EXTRUDER

BACKGROUND OF THE INVENTION

1. Field of the Invention

The present invention relates to a cavity transfer mixing extruder for uniformly mixing and extruding highly viscous materials, such as molten plastics or fluid rubbers, and, more specifically, to a cavity transfer mixing extruder having a stator provided with cavities of improved shape in the inner circumference and a rotor provided with cavities of improved shape in the outer circumference, and capable of achieving satisfactory extrusion of the materials.

2. Description of the Prior Art

Cavity transfer mixing extruders for uniformly mixing and extruding highly viscous materials, such as molten plastics or fluid rubbers, are disclosed in Japanese Patent Provisional Publication Nos. 60-107306 and 57-87344.

The cavity transfer mixing extruder disclosed in Japanese Patent Provisional Publication No. 60-107306 is illustrated in FIGS. 10 to 12. As illustrated in FIG. 10, the cavity transfer mixing extruder has a cylindrical housing 1, a cylindrical stator 2 fixedly fitted in the cylindrical housing 1, a cylindrical rotor 3 coaxially and rotatably extended within the stator 2. The rotor 3 is connected at one end thereof to an extruding member such as a screw shaft, and is driven in rotation by a motor.

As illustrated in FIG. 12, a cavity group 8 comprising cavity rows 6 arranged along the axial direction Y—Y and each having a plurality of cavities 4 arranged side by side along the circumferential direction X—X, and a cavity group 9 comprising cavity rows 7 arranged along the axial direction Y—Y and each having a plurality of cavities 5 arranged side by side along the circumferential direction X—X are formed in the inner circumference of the stator 2 excluding the opposite ends thereof and in the outer circumference of the rotor 3 excluding the opposite ends thereof, respectively. The respective cavities 4 and 5 of the cavity groups 8 and 9 are arranged with very small intervals so that the cavities 4 and 5 are distributed densely.

The respective cavities 4 and 5 of the succeeding cavity rows 6 and 7 of the cavity groups 8 and 9 are shifted by a distance lx along the circumferential direction in the respective directions of relative rotation of the cavity groups 8 and 9, namely, in a direction opposite the direction R of rotation of the rotor 3 for the cavity group 8 of the stator 2 and in the direction R of rotation of the rotor 3 for the cavity group 9 of the rotor 3, relative to the respective adjacent cavities 4 and 5 of the adjacent preceding cavity rows 6 and 7, respectively.

The cavities 4 of the cavity rows 6 of the cavity group 8 of the stator 2 are shifted by a distance ly corresponding to half the axial pitch (i.e. interval along the axial direction Y—Y) of the cavity rows 6 and 7 relative to the corresponding cavities 5 of the cavity group 9 of the rotor 3. Accordingly, the cavities 4 of each cavity row 6 of the cavity group 8 overlap the adjacent cavities 5 of the two adjacent cavity rows 7 of the cavity group 9.

As illustrated in FIG. 11, each cavity 4 (5) has an oblong shape consisting of a rectangular section 10 (11) and a pair of semicircular sections 12 (13) formed at opposite ends of the rectangular section 10 (11). The respective center axes 14 and 15 of the cavities 4 and 5 of the cavity groups 8 and 9 are inclined at the same angle $\theta$ to the direction of extrusion Z, hence to the axial direction Y—Y, to the left and to the right, respectively.

In mixing operation, the rotor 3 and the extruding member are driven for rotation by the motor to press a plurality of highly viscous materials, such as molten plastics or fluidized rubbers, through the inlet into the stator 2. Then, the material are successively moved in the direction Z of extrusion from the cavities 4 and 5 to the overlapping cavities 4 and 5 by the thrusting force of the extruding member. Since the rotor 3 is rotating, the materials differing from each other in quality or color are dispersed and mixed uniformly as they are transferred from the cavities 4 and 5 to the adjacent cavities 4 and 5 by the complex combined action of deflective thrust force and circumferential shearing force. However, the oblong cavities 4 and 5 of this known cavity transfer mixing extruder, extending at an angle to the axial direction have not been satisfactory with respect to the ability to advance the materials. Referring to FIG. 13 showing a portion of the development of the inner circumference of the stator 2 and that of the outer circumference of the rotor 2, the cavities 4 of the stator 2 move in the direction of the arrow R1 relative to the outer circumference of the rotor 3, while the cavities 5 of the rotor 3 move in the direction of the arrow R2 relative to the inner circumference of the stator 2. Then, the materials filling the cavities 4 and 5 are compelled to move toward the front of the cavities 4 and 5, namely, in the direction Z of extrusion, by the edges of the cavities 5 and 4. However, the materials are forced in the opposite direction in the front semicircular portions of the cavities 4 and 5, and hence the materials tend to stagnate in portion A of the cavities 4 and in portions B in the cavities 5. This phenomenon will be understood more clearly when the oblong cavities 4 and 5 are simulated by rectangular cavities 4' and 5' as illustrated in FIG. 14. The edges C corresponding to the semicircular edges of the oblong cavities 4 and 5 force the materials in a direction opposite to the direction Z of extrusion, and hence the materials tend to stagnate behind the edges C.

FIG. 32 illustrates another known cavity transfer mixing extruder having a vent for discharging moisture and volatile substances contained in the materials. This cavity transfer mixing extruder comprises a barrel 90, a screw 91 coaxially and rotatably extended within the barrel 90, a housing 94 and a stator 95 fitted in the housing 94. The barrel 90 has an inlet opening 92 at the rear end and a vent 93 at the middle. The housing 94 is joined to the front end of the barrel 90. The screw 91 has a first feed section 96 corresponding to the inlet opening 92, a first metering section 97 extending behind the vent 93, a vent section 98 corresponding to the vent 93, a second metering section 99 before the stator 95, and a rotor section 100 corresponding to the stator 95. The housing 94, the stator 95 and the rotor section 100 constitute a cavity transfer mixing unit.

Generally, the productivity of the cavity transfer mixing extruder of this type is dependent on the extruding capacity of the second extruding zone, namely, a section after the vent 93, which is reduced due to a pressure drop in the cavity transfer mixing unit joined to the front end of the extruding unit. Furthermore, since heat is generated in the cavity transfer mixing unit due to the cavity transfer mixing action of the cavity transfer mixing unit, and hence the rotating speed of the screw 91 is limited to a certain level, it has been impossible to extrude a material having a viscosity exceeding a certain level.

Still further, since the first zone extending before the vent 93 needs to be sufficiently long to heat the material so that the material is sufficiently plasticized, an elongate screw having a very large L/D ratio, for example, an L/D ratio in the range of 18 to 20 for rubber and in the range of 28 to 35 for plastics, is necessary, which is disadvantageous with respect to mechanical stability.

SUMMARY OF THE INVENTION

Accordingly, it is an object of the present invention to provide a cavity transfer mixing extruder having cavities capable of always forcing the material to move in the direction of extrusion.

It is another object of the present invention to provide a cavity transfer mixing extruder having a vent, capable of operating at a high extrusion rate regardless of the type of materials and having a short extrusion screw as compared with a conventional extrusion screw.

According to one aspect of the present invention, as illustrated in FIG. 9, the respective cavities 23 and 24 of the stator and the rotor are formed so that the ridges 29 and 30 defining the opposite longitudinal edges of the cavities 23 and 24 extend parallel to the direction R1 of the rotation of the stator relative to the rotor and to the direction R2 of the rotation of the rotor relative to the stator. Consequently, any force that acts in a direction opposite the direction Z of extrusion will not be produced. That is, each of the cavities formed in the inner circumference of the stator and in the outer circumference of the rotor has, as viewed in a development view, the shape of a parallelogram having a pair of opposite sides extending in a direction perpendicular to the axial direction and a pair of oppposite sides extending at an angle to the axial direction.

According to another aspect of the present invention, an annular restricting member is detachably provided at the junction of the screw and the mixing rotor so as to partition the extruding section and the mixing section. In operation, the screw and the mixing rotor are rotated by a motor, and a plurality of materials are fed through a feed opening into the cylinder 4 and are advanced by the screw. The screw is of the deep-groove type for exerting an extrusive force on the materials at a small work rate, so that less heat is generated in the materials in the extruding unit. In some cases, air bubbles are formed in the materials in the extruding unit. However, since the annular restricting member partitioning the extruding unit and the mixing unit enhances the pressure of the materials in the front portion of the extruding unit, the air bubbles contained in the materials are eliminated. Since the annular restricting member is detachable, an annular restricting member having a diameter suitable for adjusting the pressure of the materials to a desired degree can be employed.

According to a further aspect of the present invention, a cavity transfer mixing extruder comprising a barrel having a feed opening in the rear end, a vent in the middle and an outlet opening in the front end, and a screw coaxially and rotatably extended within the barrel is provided with a cavity transfer mixing unit before the vent. Materials fed through the feed opening into the barrel is conveyed to the cavity transfer mixing unit, where the materials are molten and mixed. Then, moisture and volatile substances contained in the materials are discharged through the vent as the molten and mixed materials are conveyed further toward the outlet opening. Thus, in the first section before the vent, an excellent mixing action and heat generating action of the cavity transfer mixing unit is utilized effectively for melting and mixing the materials, and hence the length of the first section necessary for plasticizing or melting the materials can be reduced. Furthermore, the molten or plasticized materials and the non-molten or non-plasticized materials are mixed uniformly and efficiently by the excellent mixing performance of the cavity transfer mixing unit. Still further, since the cavity transfer mixing unit is provided in the first section, only a pressure corresponding to a pressure drop in the cavity transfer mixing unit is required for passing the materials through the cavity transfer mixing unit, the reduction of the extruding rate due to the provision of the cavity transfer mixing unit is limited to a small extent.

A more complete appreciation of the invention and many of the attendant advantages thereof will be readily obtained as the same becomes better understood by reference to the following detailed description when considered in connection with the accompanying drawings, wherein:

BRIEF DESCRIPTION OF THE DRAWINGS

FIGS. 10 to 12 are illustrations of assistance in explaining the constitution of a conventional cavity transfer mixing extruder, wherein:

FIG. 1 is a longitudinal sectional view of a cavity transfer mixing unit, in a preferred embodiment, according to the present invention;

FIG. 2 is a partial sectional side elevation of a stator;

FIG. 3 is a sectional view taken on line III—III in FIG. 2;

FIG. 4 is a development of a portion of the inner circumference of the stator of FIG. 2;

FIG. 5 is a sectional view taken on line V—V in FIG. 4;

FIG. 6 is a side elevational view of a rotor;

FIG. 7 is a developmental view of a portion of the outer circumference of the rotor of FIG. 6;

FIG. 8 is a development view showing the relative disposition of the cavity groups;

FIG. 9 is an illustration explaining the action of cavities according to the present invention;

FIG. 10 is a fragmentary longitudinal sectional view of a conventional cavity transfer mixing unit;

FIG. 11 is an enlarged view of a cavity of the cavity transfer mixing unit of FIG. 10;

FIG. 12 is a developmental view showing the relative disposition of the cavity groups of the cavity transfer mixing unit of FIG. 10;

DESCRIPTION OF THE PREFERRED EMBODIMENT

A cavity transfer mixing extruder, in a first embodiment, according to the present invention will be described hereinafter with reference to FIGS. 1 to 8 particularly illustrating the constitution of the cavity transfer mixing unit.

Figure 1:
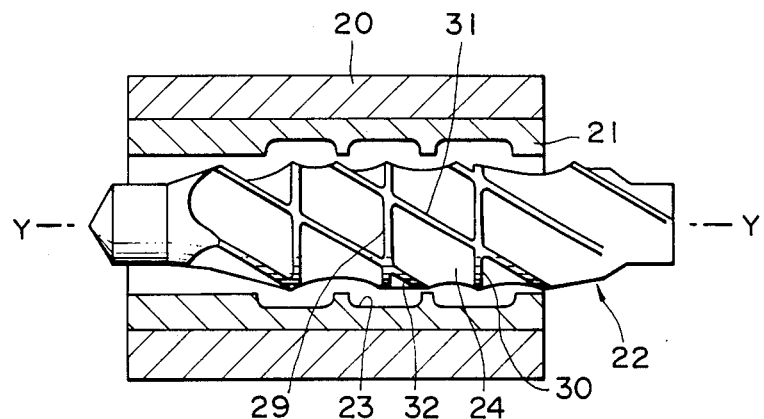
FIGS. 1 to 9 are illustrations explaining the constitution of a cavity transfer mixing extruder according to the present invention.
Figure 2:
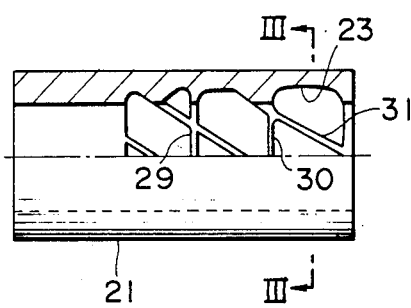
Figure 3:
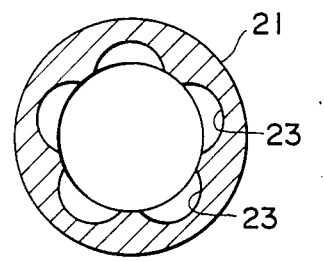
Figure 4:
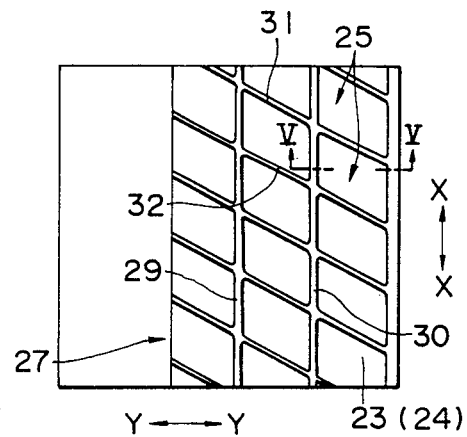

In FIG. 1, there are shown a cylindrical housing 20, a cylindrical stator 21 fixedly fitted in the housing 20, and a generally cylindrical rotor 22 coaxially and rotatably extended within the stator 21. The rotor 22 is coupled at one end thereof with a extruding member, namely, a screw (not shown). The rotor 22 is driven in rotation by a motor (not shown).

As illustrated in FIGS. 2 to 8, a cavity group 27 comprising a plurality of cavity rows 25 is arranged along the axial direction (Y—Y) and each have a plurality of cavities 23 arranged side by side along the circumferential direction (X—X), and a cavity group 28 comprising cavity rows 26 arranged along the axial direction Y—Y and each having a plurality of cavities 24 arranged side by side along the circumferential direction X—X are formed in the inner circumference of the stator 21 excluding the opposite ends of the same and in the outer circumference of the rotor 22 excluding the opposite ends of the same, respectively. The respective cavities 23 and 24 of the cavity groups 27 and 28 are arranged at very small intervals so that the cavities are densely distributed. The cavity groups 27 and 28 are the same, when developed on a plane, in arrangement, shape and size except that the cavities 23 and 24 of the cavity groups 27 and 28 are inclined in opposite directions, respectively, with respect to the axial direction Y—Y.

Figure 8:
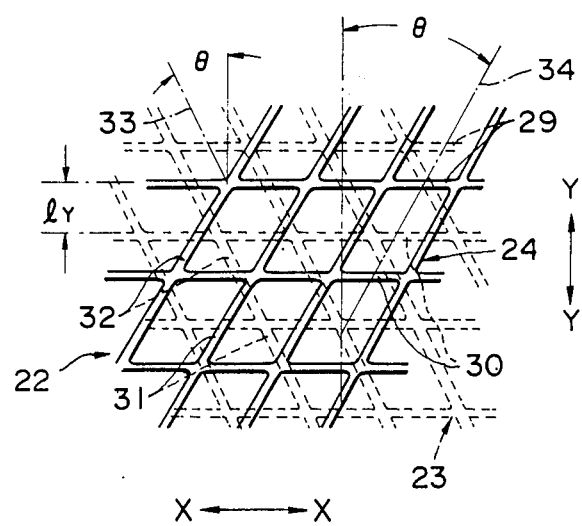
Figure 9:
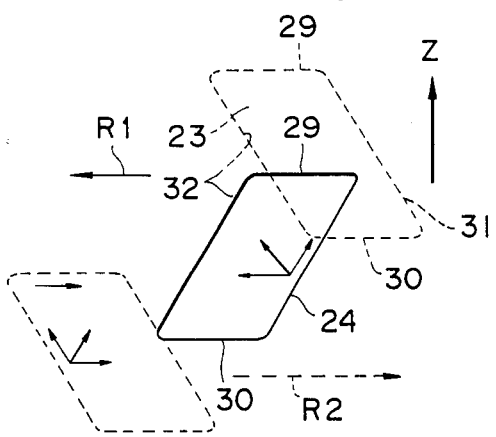
Figure 10:
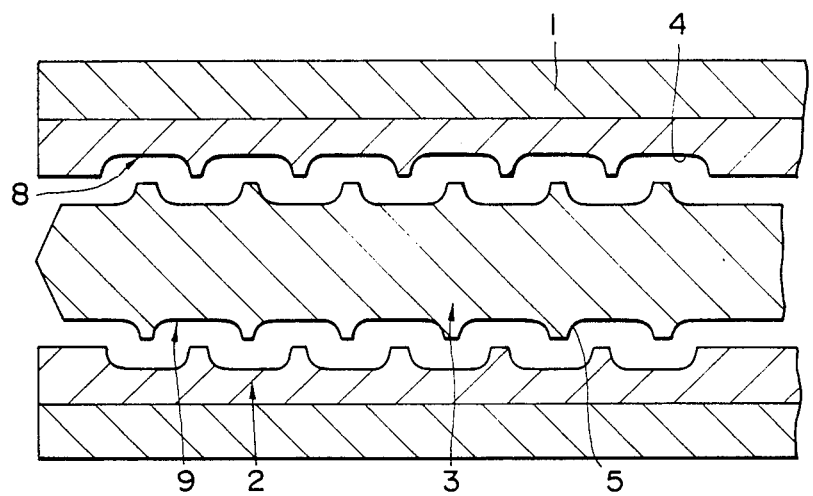
Figure 11:
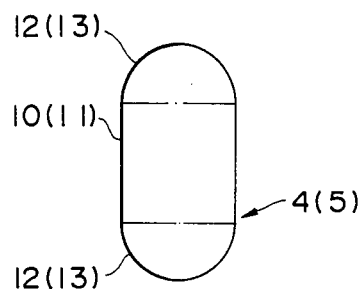
Figure 12:
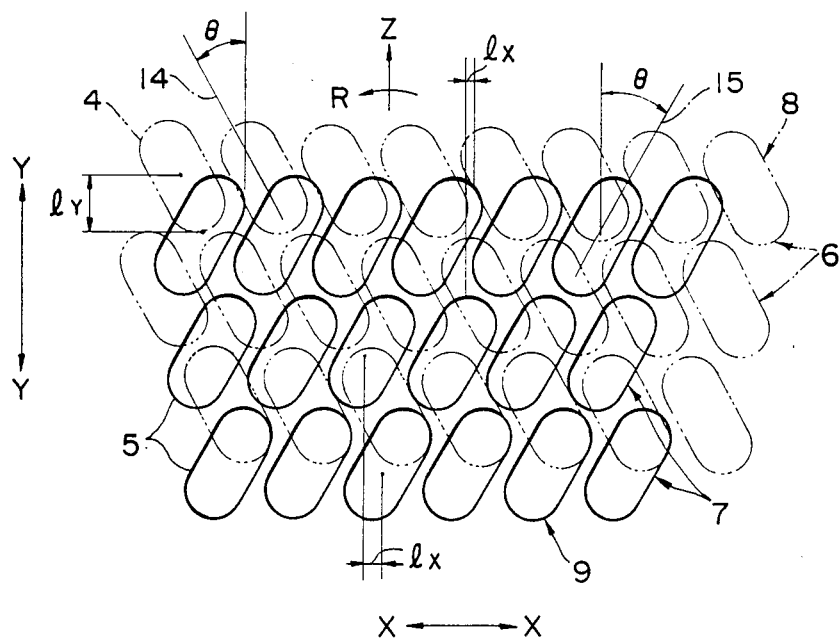
Figure 13:
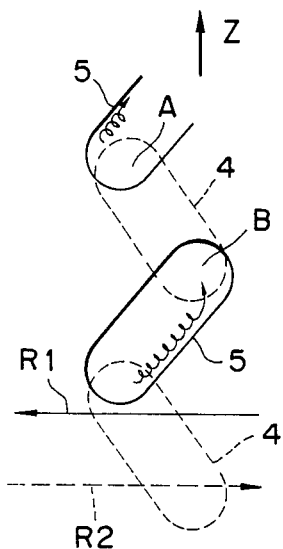
FIGS. 13 and 14 are illustrations explaining the action of the conventional cavities.
Figure 14:
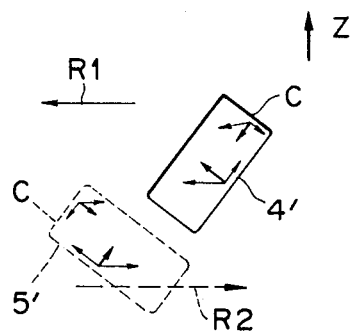

As best shown in FIG. 8, the cavities 23 of the cavity rows 25 of the cavity group 27 of the stator 21 are shifted by a distance ly corresponding to a half the axial pitch, namely, the axial interval between the adjacent cavity rows 25 and 26, relative to the corresponding cavities 24 of the cavity group 26 of the rotor 22. Accordingly, the cavities 23 of each cavity row 25 of the cavity group 27 overlap the adjacent cavities 24 of the two adjacent cavity rows 26 of the cavity group 28.

Figure 5:
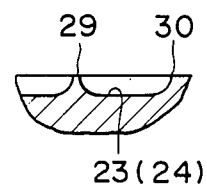
Figure 6:
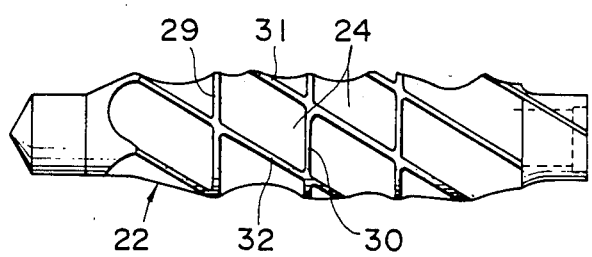
Figure 7:
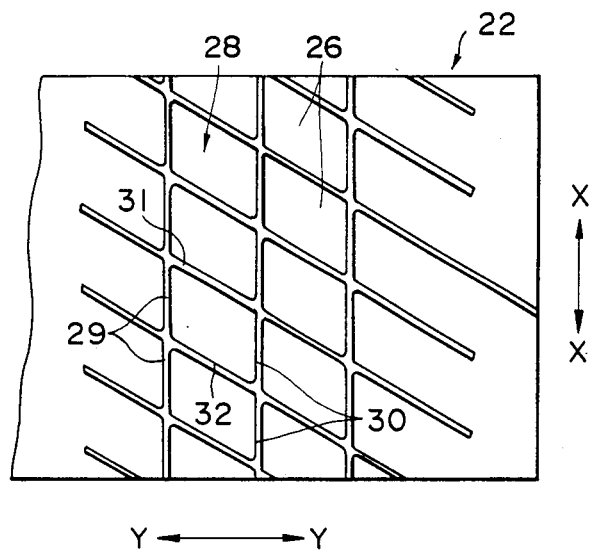

When developed on a plane, the cavities 23 and 24 each has a parallelogram shape defined by a pair of opposite, parallel straight walls 29 and 30 extending perpendicularly to the axial direction Y—Y, and a pair of opposite, parallel straight walls 31 and 32 extending at an angle to the axial direction Y—Y. The corners of the bottom surface of each one of cavities 23 and 24 is rounded as shown in FIG. 5 to prevent stagnation of the material in the cavities 23 and 24.

The respective longitudinal center axes 33 and 34 of the cavities 25 and 26 of the cavity groups 27 and 28 are inclined at the same angle $\theta$ to the axial direction Y—Y to the left and to the right, respectively, with respect to the direction Z of extrusion.

In operation, the rotor 22 and the screw are rotated by the motor to squeeze a plurality of types of highly viscous materials, such as plastics or rubbers, through the feed opening into the stator 21 by the screw. The materials thus squeezed into the stator are moved in the direction Z of extrusion by the squeezing pressure applied thereto by the screw from the cavities 23 and 24 to the overlapping adjacent cavities 23 and 24. Since the rotor 22 is rotated, the materials are subjected to the complex combined action of a deflective thrust force and a circumferential shearing force as they are transferred from cavities 23 and 24 to the cavities 23 and 24, whereby the materials which differ from each other in color or quality are mixed and dispersed uniformly.

Since the cavities 23 and 24 are parallelogrammic cavities each defined by a pair of the parallel straight walls 29 and 30, and a pair of the parallel straight walls 31 and 32, and the longitudinal axis of each cavity is inclined at an angle to the axial direction Y—Y, the materials filling the cavities 23 and 24 substantially in the direction Z of extrusion by an additional force, which is different from the squeezing force produced by the screw, as the materials are sheared between the stator 21 and the rotor 22. Since the walls 29 and 30 are parallel to the circumferential direction of the stator 21 and the rotor 22, no force that acts on the materials in a direction opposite the direction of extrusion is produced, and hence the materials never stagnate within the cavities 23 and 24.

Thus, the materials are advanced through the stator 21 by the combined action of the squeezing pressure produced by the screw, namely, the extruding member, and the pressure produced by the rotor 22, and stagnation of the materials in the cavities 23 and 24 is prevented. Accordingly, the operation for changing the materials can be completed in a short time, and the loss of materials in changing the materials is reduced.

Furthermore, the rotation of the rotor 22 reduces resistance against the flow of the materials through the stator 21, effectively prevents the stagnation of the materials in the stator 21 and reduces pressure drop in the stator 21. Consequently, the extrusion efficiency is improved, the extrusion rate is increased and productivity is enhanced.

Still further, since the resistance against the flow of the materials through the stator 21 is reduced, heat generation in the materials is mitigated, which enables satisfactory mixing of materials sensitive to heat.

A cold-feed type cavity transfer mixing extruder for rubber, in a second embodiment, according to the present invention will be described hereinafter with reference to FIGS. 15 to 20.

Figure 15:
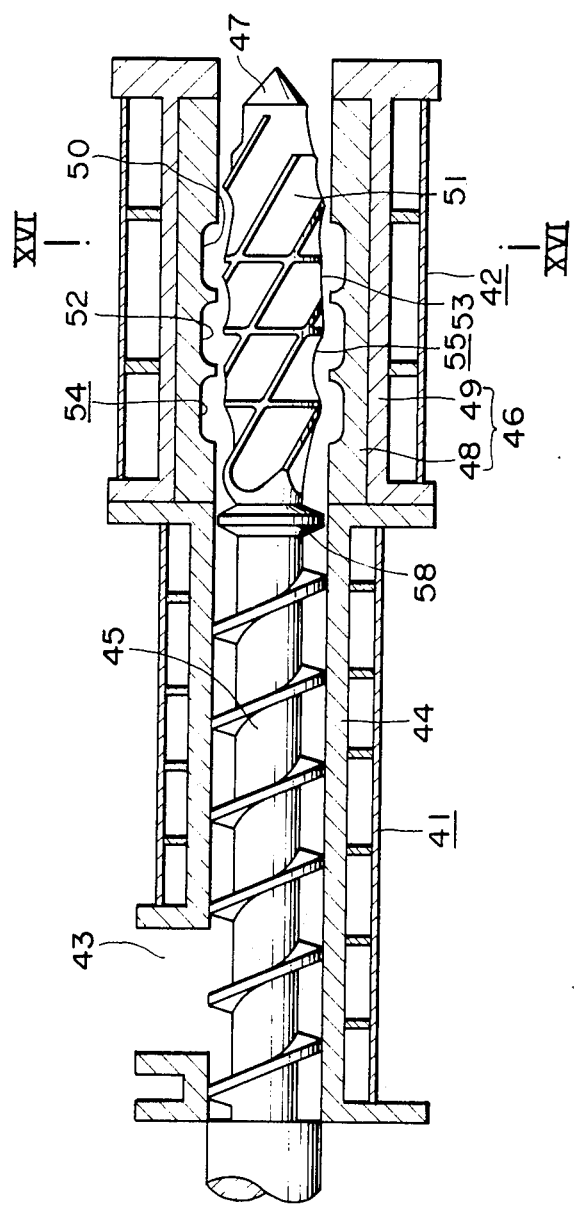
FIG. 15 is a fragmentary longitudinal sectional view of a cavity transfer mixing extruder, in a second embodiment, according to the present invention.
Figure 16:
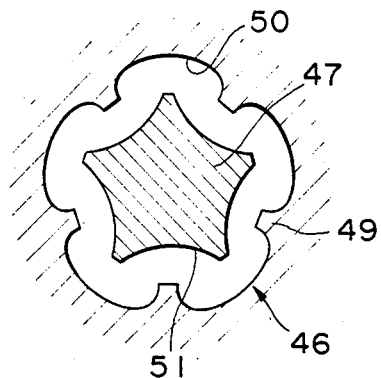
FIG. 16 is a sectional view taken on line XVI—XVI in FIG. 15.
Figure 17:
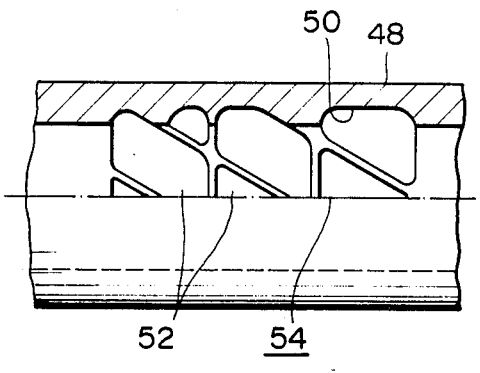
FIG. 17 is a pertially sectional view of the stator of the cavity transfer mixing extruder of FIG. 15.

In FIG. 15, there are shown an extrusion unit 41 and a mixing unit 42 disposed after the extrusion unit 41 with respect to the direction Z of extrusion. The extrusion unit 41 comprises a barrel 44 provided with a feed opening 43, and a screw 45 coaxially extended through the barrel 44. The screw 45 is of a deep-groove type having a length shorter than the conventional screw. The screw is rotated by a motor (not shown).

As illustrated in FIG. 15, the mixing unit 42 comprises a stator assembly 46 consisting of a housing 48 and a stator 49 fitted in the housing 48, and a rotor 47 coaxially extended through the stator 49. The rotor 47 is joined detachably to the front end of the screw 45 by screwing the threaded portion of the same into the screw 45.

Figure 18:
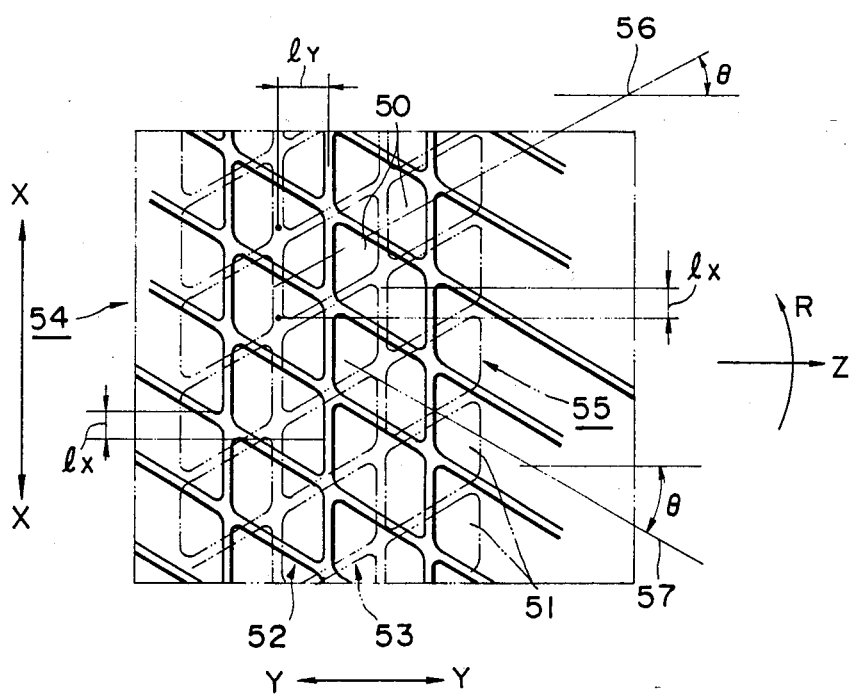
FIG. 18 is a developmental view showing the disposition of the cavity groups of the cavity transfer mixing extruder of FIG. 15.

As illustrated in FIG. 18, a cavity group 54 comprising cavity rows 52 arranged along the axial direction Y—Y and each having a plurality of cavities 50 arranged side by side along the circumferential direction X—X, and a cavity group 55 comprising cavity rows 53 arranged along the axial direction Y—Y and each having a plurality of cavities 51 arranged side by side along the circumferential direction X—X are formed in the inner circumference of the stator 49 and in the outer circumference of the rotor 47, respectively. The respective cavities 50 and 51 of the cavity groups 54 and 55 are arranged with very small intervals so that the cavities are distributed densely.

The respective cavities 50 and 51 of the succeeding cavity rows 54 and 55 of the cavity groups 54 and 55 are shifted by a distance lx along the circumferential direction in the respective directions of relative rotation of the cavity groups 54 and 55, namely, in a direction opposite the direction R of rotation of the rotor 47 for the cavity groups 54 of the stator 49 and in the direction R of rotation of the rotor 47 for the cavity group 55 of the rotor 47, relative to the respective adjacent cavities 50 and 51 of the adjacent preceding cavity rows 52 and 53, respectively. Thus, the cavities 50 and 51 are densely distributed by shifting the respective cavities 50 and 51 of the succeeding cavity rows 52 and 53 relative to the adjacent cavities 50 and 51 of the preceding cavity rows, respectively.

The relative distribution of the cavities 50 and 51, the shape of the cavities, and the inclination of the longitudinal axes of the cavities 50 and 51 are the same as those of the first embodiment.

Figure 19:
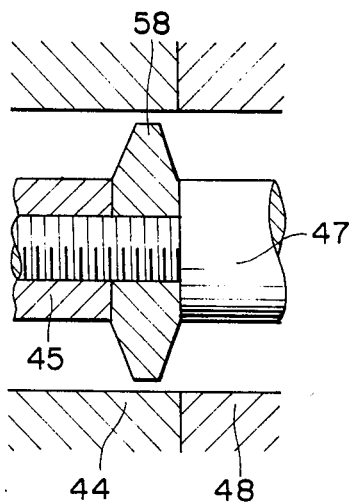
FIG. 19 is a fragmentary sectional view of a portion of the cavity transfer mixing extruder of FIG. 15, provided with an annular restricting member.

As illustrated in FIG. 19, an annular restricting member 58 is detachably fixed on the rear portion of the rotor 47, and is fixedly held between the rotor 47 and the screw 45. The restricting member 58 has an outside diameter greater than those of the screw 45 and the rotor 47 so that the extrusion unit 41 and the mixing unit 42 are divided by the restricting member 58.

Figure 20:
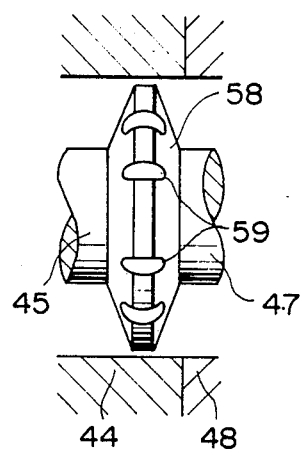
FIG. 20 is a fragmentary cutaway view showing another annular restricting member.

FIG. 20 illustrates another restricting member according to the present invention. This restricting member 58 is provided with axial grooves 59 formed along the circumference thereof at regular angular intervals to facilitate the passage of the materials across the restricting member 58 from the extrusion unit 41 into the mixing unit 42. Therefore, restricting member 58 is effective for preventing the burning of the materials, particularly, in extruding and mixing highly viscous materials such as rubbers.

Figure 21:
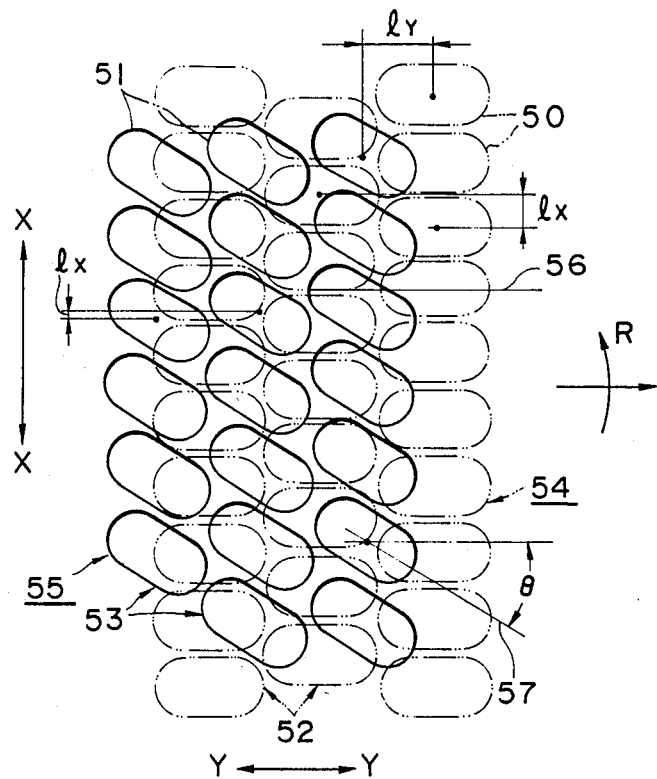
FIG. 21 is a developmental view showing the disposition of cavity groups of a cavity transfer mixing extruder, in a third embodiment, according to the present invention.
Figure 22:
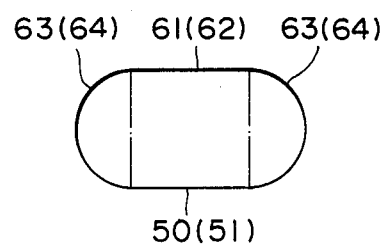
FIG. 22 is an enlarged plan view of a cavity employed in the third embodiment.

A cold-feed type cavity transfer mixing extruder, in a third embodiment, according to the present invention will now be described with reference to FIGS. 21 and 22.

The constitution of the third embodiment is substantially the same as that of the second embodiment, except that the respective cavities 50 and 51 of the stator 46 and the rotor 47 are different from those of the second embodiment. Accordingly, the third embodiment will be described only in terms of the shape and distribution of the cavities 50 and 51.

The cavities 50 and 51 have the same oblong shape and consists of rectangular sections 61 and 62, and a pair of semicircular sections 63 and a pair of semicircular sections 64 joined to opposite axial ends of the rectangular sections 61 and 62, respectively. Only the cavities 51 of the rotor 47 each has a longitudinal axis inclined at an angle $\theta$ with respect to the axial direction Y—Y.

The cavities 50 of the stator 46 are arranged so that the circumferential distance lx' between the center of the cavity 50 of one of the cavity rows 52 and the center of the adjacent cavity 50 of the adjacent cavity row 52 is a half the circumferential distance between the respective centers of the cavities of the same cavity row 52. The distance lx' is considerably greater than the circumferential distance lx between the center of the cavity 51 of one of the cavity rows 53 and the center of the adjacent cavity 51 of the adjacent cavity row 53. Only the cavities 50 of the stator 46, instead of the cavities 51 of the rotor 47, may be inclined with respect to the axial direction Y—Y, and the cavities 50 and 51 may be elliptic cavities.

The performance of a cold-feed type cavity transfer mixing extruder incorporating the present invention was confirmed experimentally.

The cold-feed type cavity transfer mixing extruder has a screw having an L/D ratio of eight, a stator provided with three cavity rows, and a rotor provided with three cavity rows. Blue natural rubber compound ribbons and yellow natural rubber compound ribbons (Mooney viscosity MLH4: 60 at 100° C.) were subjected to experimental mixing extrusion on the cold-feed type cavity transfer mixing extruder. The results of the experimental operation are shown in FIG. 23 showing the variations of the extrusion rate and extrusion temperature with the rotating speed of the screw and the rotor.

Figure 23:
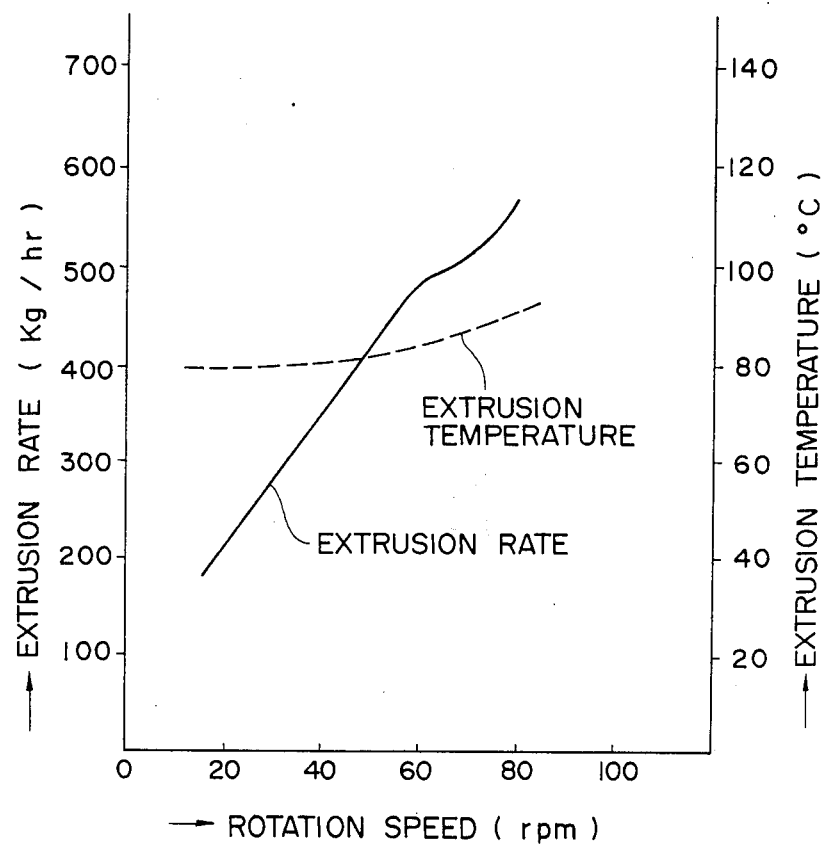
FIG. 23 is a graph showing the variations of extrusion rate and extrusion temperature with the rotating speed of the screw.

It is known from FIG. 23 that the extrusion rate was 580 kg/hr and the extrusion temperature, namely, the temperature of the materials extruded, was 93° C., when the rotating speed of the screw and the rotor was 80 rpm. Well mixed and kneaded green natural rubber compound having a small variation in temperature distribution was obtained. The rubber compounds were mixed satisfactorily, the extrusion temperature remained at a low level, and the temperature variation in the extruded compound was as small as ±1° C., regardless of the rotating speed of the screw and the rotor. It was proved that the performance of the cold-feed type cavity transfer mixing extruder incorporating the present invention is superior to that of the conventional cold-feed type cavity transfer mixing extruder.

When the cold-feed type cavity transfer mixing extruder was operated without the restricting member 58, some air bubbles were contained in the extruded rubber compound.

Thus, according to the present invention, the heat generation of the cavity transfer mixing extruder can be reduced even in mixing and extruding highly viscous materials without sacrificing the degree of mixing and productivity, and even materials which require severe restriction on the extrusion temperature can be uniformly and satisfactorily mixed and extruded with high efficiency. The provision of the restricting member between the screw and the rotor prevents materials containing air bubbles from being squeezed into the mixing unit. Furthermore, since the restricting member is detachable, the squeezing pressure can be adjusted to a desired value by selectively using a suitable restricting member among a plurality of spare restricting members.

A cavity transfer mixing extruder, in a fourth embodiment, according to the present invention will be described hereinafter with reference to FIGS. 24 to 31.

Figure 24:
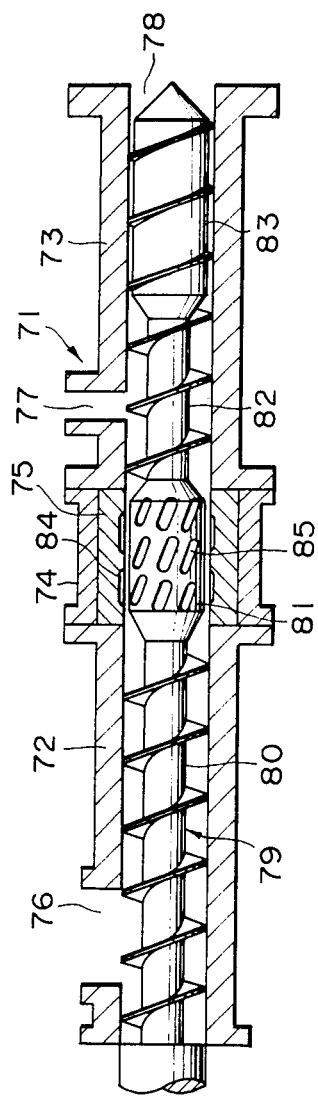
FIG. 24 is a longitudinal sectional view of a cavity transfer mixing extruder, in a fourth embodiment, according to the present invention.

In FIG. 24, there is shown a cavity transfer mixing extruder in a fourth embodiment of the present invention, comprising a barrel 71 consisting of a first barrel section 72 and a second barrel section 73, a housing 74 disposed between the fixedly joined to the firsst and second barrel sections 72 and 73, a stator 75 fixedly fitted in the housing 74, and a screw shaft 79 coaxially and rotatably extended through the barrel 71. A feed opening 76 is formed at the rear end of the first barrel section 72; a vent 77 is formed at the rear end, namely, at a position near the housing 74, of the second barrel section 73; an outlet opening 78 is formed at the front end of the second barrel section 73. A die (not shown), is attached to the front end of the second barrel section 73.

The screw shaft 79 has a first screw section 10 corresponding to the first barrel section 72, a rotor section 81 corresponding to the stator 75, a second screw section 82 corresponding to a portion having the vent 77 of the second barrel section 73, and a metering screw section 83 corresponding to the front portion of the second barrel section 73. The housing 74, the stator 75 and the rotor section 81 constitute a mixing unit.

Figure 27:
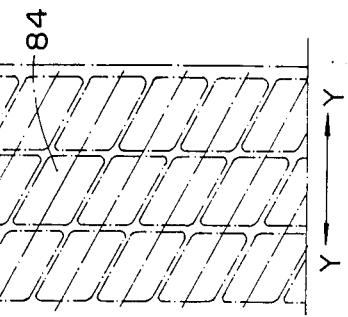
FIG. 27 is a developmental view of the inner circumference of the stator of the fourth embodiment.
Figure 26:
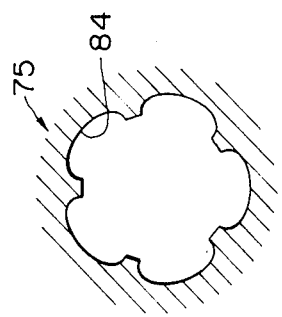
FIG. 26 is a sectional view taken on line XXV—XXV in FIG. 25.
Figure 25:
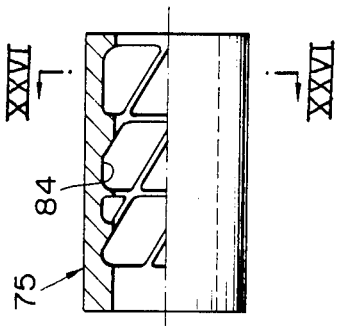
FIG. 25 is a partially sectional view of the stator of the fourth embodiment.
Figure 28:
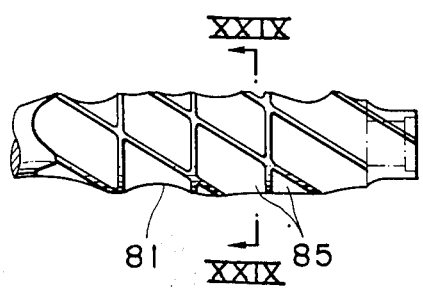
FIG. 28 is a fragmentary side elevational view of the rotor of the fourth embodiment.
Figure 29:
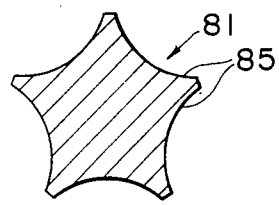
FIG. 29 is a sectional view taken on line XXIX—XXIX in FIG. 28.

As illustrated in FIGS. 25 to 27, the stator 75 is provided on the inner circumference thereof with cavities 84 each having a longitudinal axis extending at an angle to the axial direction Y—Y as viewed in a developmental view shown in FIG. 27.

Figure 30:
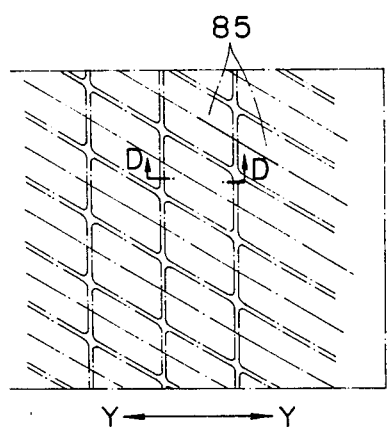
FIG. 30 is a development of the outer circumference of the rotor of the fourth embodiment.
Figure 31:
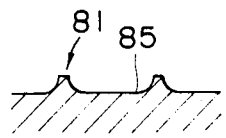
FIG. 31 is a sectional view taken on line XXXI—XXXI in FIG. 31.
Figure 32:
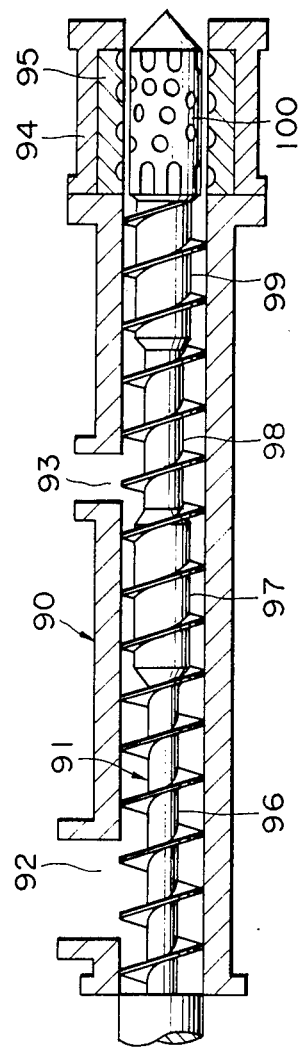
FIG. 32 is a longitudinal sectional view of a conventional cavity transfer mixing extruder.

As illustrated in FIGS. 28 to 31, the rotor section 11 is provided in the outer circumference thereof with cavities 85 each having a longitudinal axis extending at an angle to the axial direction Y—Y as viewed in the developmental view in FIG. 30.

Thus, the relative circumferential movement of the cavities 84 and 85 causes the material to advance. The cavities 84 and 85 are formed close to each other, respectively, so that the upper surfaces of the lands, namely, the walls, defining the cavities 84 and 85 are formed in a small width to reduce the pressure loss due to the resistance of the inner circumference of the stator 75 and the outer circumference of the rotor section 81 against the flow of the material to a lesser extent in order that heat generation in the mixing unit attributable to the resistance of the stator 75 and the rotor section 81 against the flow of the material is reduced.

In mixing and extruding raw rubber compounds on the cavity transfer mixing extruder, the raw rubber compounds fed through the feed opening are pushed forward by the first screw section 80 into the mixing unit, where the raw rubber compounds are mixed between the respective cavities 84 and 85 of the stator 75 and the rotor section 81, and are plasticized by being heated uniformly. While the mixed rubber compounds are pushed forward by the second screw section 82, moisture and volatile substances contained in the mixed rubber compounds are discharged through the vent 77. Then, the mixed rubber compounds thus deaerated are pushed further forward, and then the mixed rubber compounds are extruded through the die (not shown), after passing the metering section 83.

Since the respective cavities 84 and 85 of the stator 75 and the rotor section 81 are arranged with their longitudinal axes inclined at an angle to the axial direction Y—Y, the material is urged forward by the lands of the cavities 84 and 85 as the screw shaft 79 is rotated. Accordingly, the pressure loss and the increment of temperature in the mixing unit is reduced and consequently, the screw shaft 79 may be rotated at a high rotating speed so as to enhance the productivity of the cavity transfer mixing extruder even in mixing and extruding materials which requires a processing temperature below a certain level to prevent scorching, such as rubber compounds. Furthermore, since the cavities 84 and 85, which are the same as those of the foregoing embodiments in shape and disposition, propel the materials, the cavity transfer mixing extruder of the present invention requires less time for changing the materials as compared with the conventional cavity transfer mixing extruder employing semispherical cavities.

In mixing and extruding plastics on the cavity transfer mixing extruder, it is desirable to provide the first screw section 80 with a compressing unit in order that plasticization and melting of the plastics are accelerated by the shearing action of the first screw section 80.

In mixing and extruding rubbers, the use of a combination of a deep grooved screw and the mixing unit enhances the extrusion rate remarkably, whereas it is possible, with some kinds of rubber compounds, that air bubbles are formed in the mixed rubber compounds. However, the cavity transfer mixing extruder of the present invention is able to extrude satisfactorily mixed rubber compounds of uniform temperature even when a deep grooved screw is employed as the first screw section, because the air bubbles are discharged through the vent while the mixed rubber compounds are advanced by the second screw section.

Although the parallelogram cavities are most desirable, the cavities may be semispherical cavities or oblong cavities.

Although the invention has been described in its preferred forms with a certain degree of particularity, it is to be understood that many variations and changes are possible in the invention without departing from the scope and spirit thereof.

What is claimed is:

1. A cavity transfer mixing extruder comprising:
   an extrusion unit which comprises a barrel provided with a feed opening in the rear portion thereof; and a screw shaft coaxially and rotatably extended through the barrel; and
   a mixing unit which comprises a housing; a stator fixedly fitted in the housing and provided with a first cavity group including a plurality of circumferential rows of cavities located in the inner circumference thereof excluding opposite ends thereof; and a rotor joined coaxially to a front end of the screw shaft, coaxially and rotatably extended through the stator, and provided with a second cavity group including a plurality of circumferential rows of cavities in the outer circumference thereof excluding the opposite ends thereof, wherein the respective cavities of the first and second cavity groups, when developed on a plane, each has a parallelogram shape defined by a pair of opposite, parallel straight walls extending perpendicularly to an axial direction, and a pair of opposite, parallel straight walls inclined at an angle to the axial direction; the longitudinal axes of the cavities of the first cavity group and the longitudinal axes of the cavities of the second cavity group being inclined in opposite directions with respect to the axial direction; the cavity rows of the first cavity group and the cavity rows of the second cavity groups are the same in axial pitch; and the cavity rows of the first cavity group are shifted axially relative to the cavity rows of the second cavity group by a distance corresponding to half the axial pitch so that each cavity of each cavity row of the first cavity group overlaps the adjacent cavities of the adjacent cavity rows of the second cavity group.

2. A cavity transfer mixing extruder as recited in claim 1, wherein said rotor is detachably connected to the screw shaft, and an annular restricting member having an outside diameter greater than those of the screw shaft and the rotor is detachably connected at a junction of the screw shaft and the rotor so as to divide the extrusion unit and the mixing unit.

3. A cavity transfer mixing extruder as recited in claim 1, further comprising a barrel having a vent in the rear portion thereof joined to the front end of the housing so that the vent is disposed near the mixing unit, and a screw shaft having an extruding screw section and a metering screw section joined coaxially to the front end of the rotor with the extruding screw section extended within a portion having the vent to the barrel.

* * * * *